(12) United States Patent
Martikainen et al.

(10) Patent No.: US 8,316,372 B2
(45) Date of Patent: Nov. 20, 2012

(54) METHOD FOR MULTICLASS TASK ALLOCATION

(75) Inventors: Olli Martikainen, Helsinki (FI); Valeriy A. Naumov, Helsinki (FI)

(73) Assignee: Konsultointi Martikainen Oy (FI)

( * ) Notice: Subject to any disclaimer, the term of this patent is extended or adjusted under 35 U.S.C. 154(b) by 437 days.

(21) Appl. No.: 12/580,895

(22) Filed: Oct. 16, 2009

(65) Prior Publication Data

US 2011/0093860 A1    Apr. 21, 2011

(51) Int. Cl.
G06F 9/46 (2006.01)
(52) U.S. Cl. ....................................... 718/104
(58) Field of Classification Search ............... 718/102, 718/103, 104
See application file for complete search history.

(56) References Cited

U.S. PATENT DOCUMENTS

| | | | | |
|---|---|---|---|---|
| 5,596,750 | A  * | 1/1997  | Li et al. ........................ | 718/101 |
| 6,438,134 | B1 * | 8/2002  | Chow et al. ................... | 370/412 |
| 8,032,890 | B2 * | 10/2011 | Brendle et al. ................ | 718/104 |
| 2005/0022157 | A1 * | 1/2005  | Brendle et al. ................ | 717/104 |
| 2010/0257015 | A1 * | 10/2010 | Molander ....................... | 705/9 |
| 2010/0293550 | A1 * | 11/2010 | Gnanasambandam et al. ............ | 718/104 |

FOREIGN PATENT DOCUMENTS

| | | |
|---|---|---|
| FI | 118167 B | 7/2007 |
| WO | WO-2006045881 A1 | 5/2006 |

OTHER PUBLICATIONS

Cao, J., et al., "An Approximate Analysis of Load Balancing Using Stale State Information for Servers in Parallel", *Proceedings of 2nd IASTED International Conference on Communications, Internet and Information Technology*, (Nov. 2003), 7 pgs.

Dahlin, M., "Interpreting Stale Load Information" *IEEE Transactions on Parallel and Distributed Systems*, 11(10), (Oct. 2000), 1033-1047.

Mirchandaney, R., et al., "Analysis of the Effects of Delays on Load Sharing", *IEEE Transactions on Computers*, 38(11), (Nov. 1989), 1513-1525.

Mitzenmacher, M., "How Useful Is Old Information?", *IEEE Transactions on Parallel and Distributed Systems*, 11(1), (2000), 6-20.

Naumov, V., et al., "Idle Period Notification Policy for Dynamic Task Assignment", *Proceedings of the 2005 International Conference on Parallel Processing Workshops (ICPPW '05)*, (2005), 331-335.

Shirazi, B. A., *Scheduling and Load Balancing in Parallel and Distributed Systems*, Shirazi, B.A., et al., Editors, Wiley—IEEE Computer Society Press, , (1995), 503 pgs.

* cited by examiner

*Primary Examiner* — Van Nguyen
(74) *Attorney, Agent, or Firm* — Schwegman Lundberg & Woessner, P.A.

(57) ABSTRACT

Embodiments of the invention include a method of selection of server in a system including at least one dispatcher and several servers, in which system when a new task of a given class arrives, then the dispatcher assigns the task to one of these servers, characterized that the selection of the servers by the dispatcher is based on the MIPN (Multiclass Idle Period Notification) information, which is sent by the servers to the dispatcher.

4 Claims, 4 Drawing Sheets

METHOD FOR MULTICLASS TASK ALLOCATION

BACKGROUND

Various distributed server systems consist of service nodes and dispatchers, which assign arriving tasks to one of the service nodes. Many task assignment policies have been already proposed, which differ in system state estimation, decision making and policy objectives.

DETAILED DESCRIPTION

Figure 1:
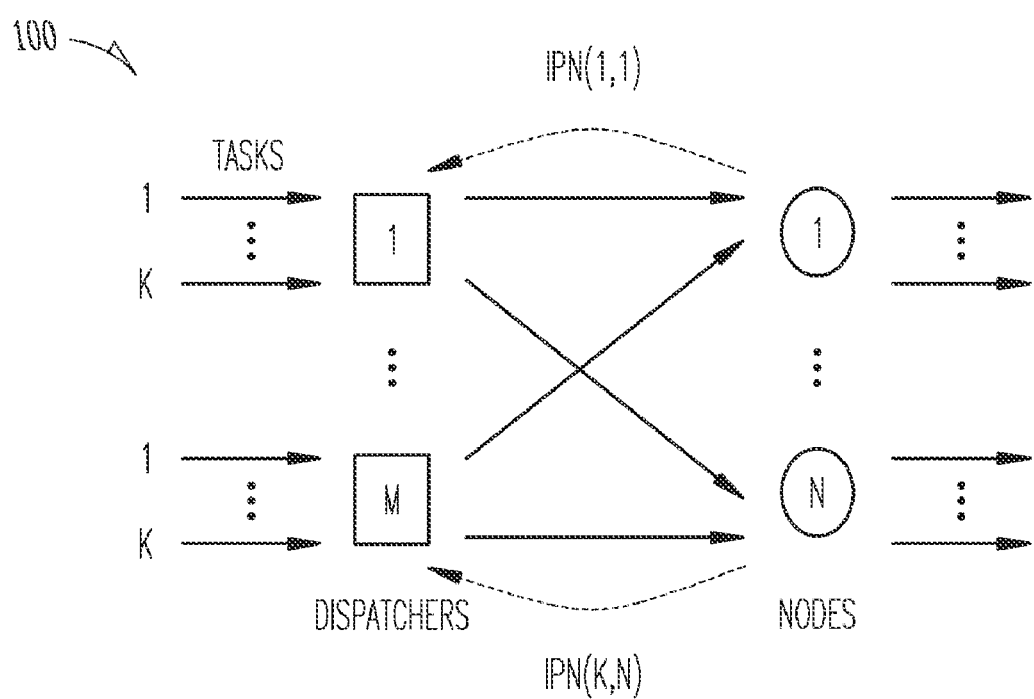
FIG. 1 is a diagram of a distributed server system with multiclass idle period notifications, according to various embodiments.

In this description we consider the task assignment problem in a distributed server system, consisting of multiclass tasks, multiserver nodes and dispatchers, which assign arriving tasks to service nodes. We propose new dynamic Multiclass Idle Period Notification policy, in which each service node only needs for each class to notify dispatchers on the start of every idle period. We demonstrate by simulation that this policy performs as well as Shortest Expected Delay policy, which requires immediate knowledge of the state of each node at the time of every arrival.

In various embodiments, a distributed server system includes service nodes and dispatchers, which assign arriving tasks to one of service nodes. Many task assignment policies have been already proposed, which differ in system state estimation, decision-making and policy objectives. An important element of a task assignment policy is the information it requires to operate. Dynamic task assignment policies use the knowledge of the current global state information to distribute the workload among servers. Typically if a new task arrives at time t, a load index $r_i(t)$ is evaluated for each server i. The server that yields minimum load index is selected to execute the task. For example, in the Shortest Expected Delay (SED) policy, the load index is the expected response time to complete new task. It is estimated using formula $r_i(t)=m_i(s_i(t)+1)$, where $s_i(t)$ is the number of tasks at server i including the one in service at time t of arrival, and $m_i$ is the mean service time.

For many distributed systems it is unrealistic to have immediate knowledge of the system state information and dispatchers distribute tasks using stale information. Several authors examine the task assignment with stale information. It was found that task assignment policies can have extremely bad behavior when state information is out of date. New task assignment policies which outperform SED when use old information were proposed. In Idle Period Notification (IPN) policy, servers send special control messages to notify dispatcher of start of every idle period. Dispatchers use idle period notifications to balance the amount of work assigned to each server during its current busy period. IPN policy uses small amount of state information but performs as well as SED policy.

In this description we generalize IPN policy to distributed systems with multiple dispatchers, multiserver nodes and multiclass tasks. We propose new Multiclass Idle Period Notification (MIPN) policy, in which selection of the nodes by the dispatcher is based on the MIPN information sent by the nodes to the dispatcher. MIPN information is sent by a node each time it becomes free from the tasks of a particular class, and contains at least the identification of that node and the identification of that class. The dispatcher keeps record of the times it has received the last MIPN for each class and node. Dispatcher defines the start time of the current busy period of a node for a class as the moment when the first task of that class is sent by the dispatcher to the node after it has received from that node the last MIPN information related to that class. Dispatcher defines the end time of the current busy period of a node for a class as the moment when dispatcher receives from the node new MIPN information related to that class. The length of a busy period of a node for a class is calculated as the difference of the end time and the start time of that busy period.

Dispatcher calculates the amount of work assigned to the node during the current busy period of a node for a class as the sum of the amount of work associated with each task of that class assigned to the node during the current busy period of the node for that class. Arriving task is assigned by dispatcher to the node with the smallest amount of work assigned to the node by that dispatcher during the current busy period of the node for the class to which arrived task belongs.

We demonstrate by simulation that this policy performs as well as Shortest Expected Delay policy, which requires immediate knowledge of the state of each node at the time of every arrival.

Multiclass Idle Period Notification Policy

Consider a distributed system 100, consisting of N service nodes and M dispatchers, which assign tasks to service nodes (see FIG. 1). Each service node can be either single server queue or multiserver queue or may have more complex internal structure. Tasks are divided into K classes, where one or more classes of tasks may have priority over other classes. Tasks within a given class are executed in FIFO order. We denote $D_{c,n}$ the set of all dispatchers, which may send class c tasks to node n. Tasks of a class c arriving to a dispatcher d requires a service at one node $n \in S_{c,d}$, where $S_{c,d}$ is the set of all service nodes available to class c tasks from dispatcher d.

Figure 2:
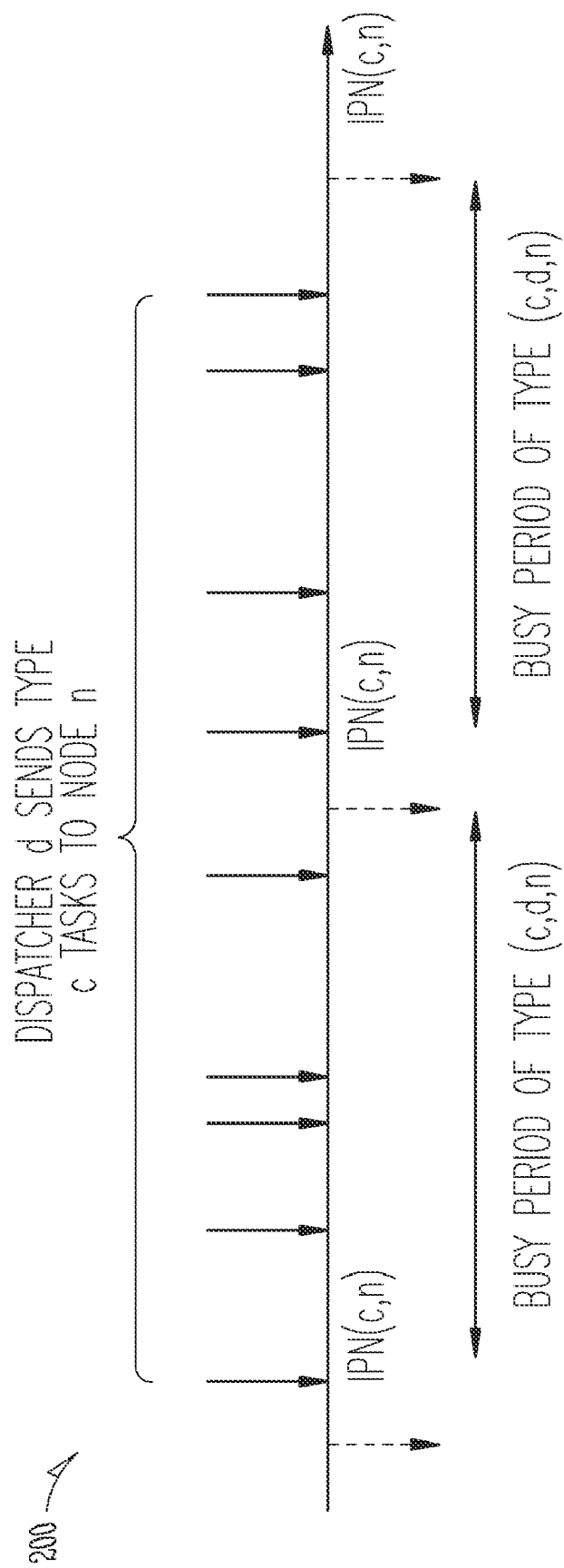
FIG. 2 is a diagram illustrating idle period notifications and busy periods, according to various embodiments.

In proposed MIPN policy when class c task departs the node n and there is no other class c tasks in the node n it sends the idle period notification IPN(c, n) to all dispatchers $d \in D_{c,n}$. We define a busy period of type (c, d, n) as follows. Busy period of type (c, d, n) begins when dispatcher d directs first, after receiving IPN(c,n), class c task to node n. It ends when dispatcher d receives next IPN(c,n) (see FIG. 2, diagram 200).

Each class c task forwarded to a node $n \in S_{c,d}$ is characterized by a nonnegative weight $w_{c,d,n}$, which may depend of the time t of task arrival. For each class c and node n dispatcher $d \in D_{c,n}$ tries to balance the aggregate weight of class c tasks assigned to node n during current busy period of type (c, d, n). It maintains load index $W_{c,d,n}$, which is set to $w_{c,d,n}$ at time t=0 and also each time, when dispatcher d receives idle period notification IPN(c,n). In MIPN policy if a new task of class c arrives to a dispatcher d, then the node $n \in S_{c,d}$ that yields minimum load index $W_{c,d,n}$, is selected to execute the task.

After forwarding class c task to node n, dispatcher d increments load index $W_{c,d,n}$ by $w_{c,d,n}$.

Behavior of MIPN policy is determined by the weights $w_{c,d,n}$, which can be specified either statically or dynamically. Dispatcher can accommodate task assignment policy to changes in traffic conditions by dynamically changing weights. Dispatchers use idle period notifications for. calculation of the length of busy periods. of different types and the number of tasks assigned to each node during busy periods.

Let $$\tau_{c,d,n}^{(j)}$$

be the length of j-th busy period of type (c,d,n) and $$v_{c,d,n}^{(j)}$$

be the number of tasks sent by dispatcher d to node n during this busy period. After completion of j-th busy period of type (c,d,n) the weight $w_{c,d,n}$ is updated using exponentially weighted average given by $$w_{c,d,n}^{(j)} = (1-\alpha)w_{c,d,n}^{(j-1)} + \alpha \frac{\tau_{c,d,n}^{(j)}}{v_{c,d,n}^{(j)}}, 0 < \alpha < 1. \quad (1)$$

Updated value $w_{c,d,n}^{(j)}$ of the weight $w_{c,d,n}$ is used for assignment of tasks arriving during (j+1)-th busy period of type (c,d,n).

EXAMPLES WITH SIMULATION

We simulate two different systems, which differ in the variability of the processing rates of the servers. The first system, System 1, consists of 10 single server nodes. The processing rates of the servers of System 1 form an arithmetic series, that is $r_n = 3n/11, n=1,2\ldots 10.$ System 1 has an aggregate processing rate of 15. The second system, System 2, has 8 single server nodes, and the processing rates of the servers form the geometric series $r_n = 2^{n-i}, n=1, 2 \ldots 8.$ Its aggregate processing rate is equal to 255.

Tasks are divided into C priority classes, where the class 1 tasks have the highest priority, class 2 tasks the second highest priority and so on. Tasks of class c arrive to the system from a Poisson source with rate $\lambda_c = \lambda/C$, where $\lambda$ is the total task arrival rate. Each server is available to tasks of any priority class. The tasks within a given priority class are executed in FIFO order before servicing those of lower priority classes. Once started, each task is executed to completion without interruption; i.e., there is no preemption. We compare MIPN policy with Shortest Expected Delay (SED) policy. In SED policy if a new class c task arrives at time $\tau$ for each server n the expected response time to complete new task is estimated as $$r_{c,n}(t) = \begin{cases} m_{c,n} + \sum_{i=1}^{c} s_{i,n}(t)m_{i,n}, & \sum_{i=1}^{c} s_{i,n}(t) > 0, \\ m_{c,n} + m_{pn}(t), n, & \sum_{i=1}^{c} s_{i,n}(t) = 0, \sum_{i=c+1}^{C} s_{i,n}(t) > 0, \\ m_{c,n}, & \sum_{i=1}^{C} s_{i,n}(t) = 0. \end{cases} \quad (2)$$

Here $m_{i,n}$ is the mean service time of class i tasks at node n, $S_{i,n}(t)$ is the number of class i tasks at node n including the one in service at time $\tau$ of arrival and $$p_n(t) = \min_i (s_{i,n}(t) > 0)$$

is the priority of a task at service at node n. The server that yields minimum expected response time is selected to execute the task.

Figure 3:
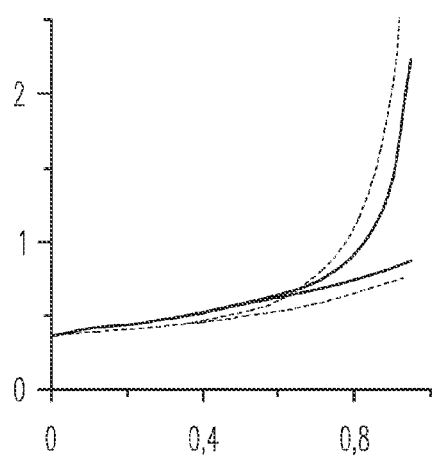
FIG. 3 is a set of diagrams illustrating average response times versus server utilization for SED (dash lines) and MIPN (solid lines) policies: constant service times, 2 priority classes (a) and 4 priority classes (b), according to various embodiments.
Figure 3:
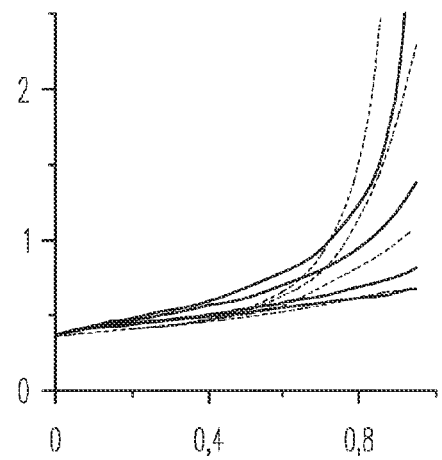
Figure 3:
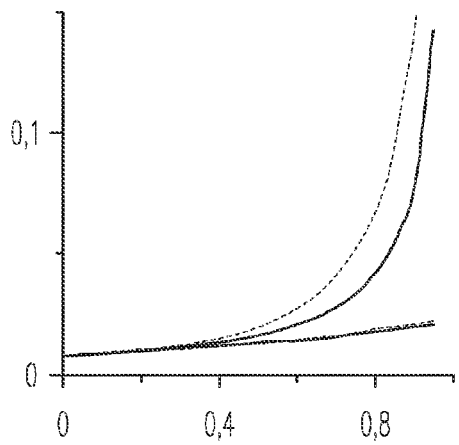
Figure 3:
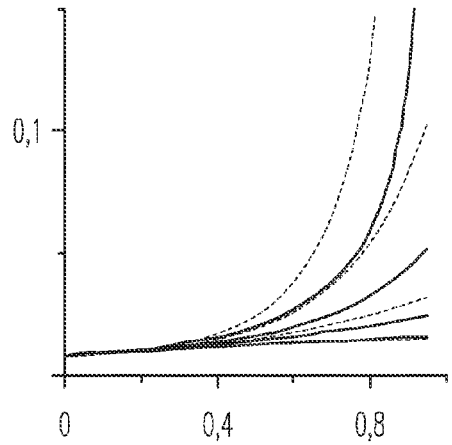
Figure 4:
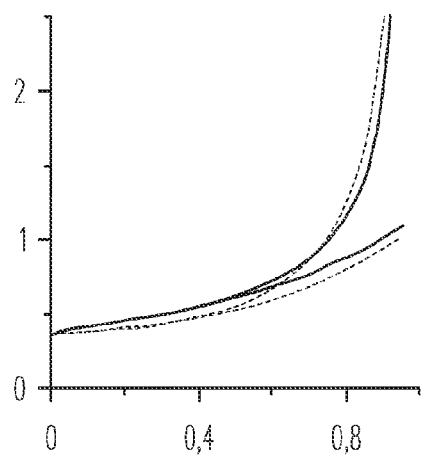
FIG. 4 is a set of diagrams illustrating average response times versus server utilization for SED (dash lines) and MIPN (solid lines) policies: exponential service times, 2 priority classes (a) and 4 priority classes (b), according to various embodiments.
Figure 4:
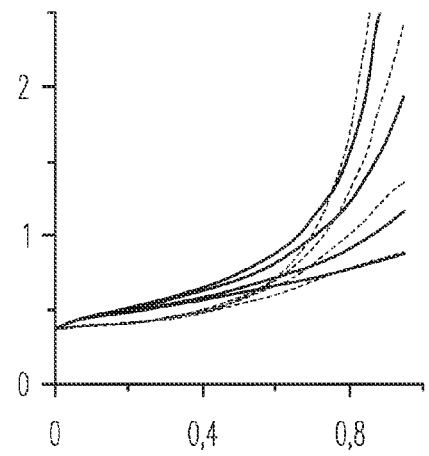
Figure 4:
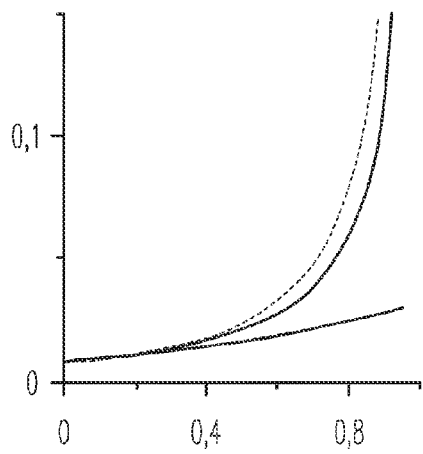
Figure 4:
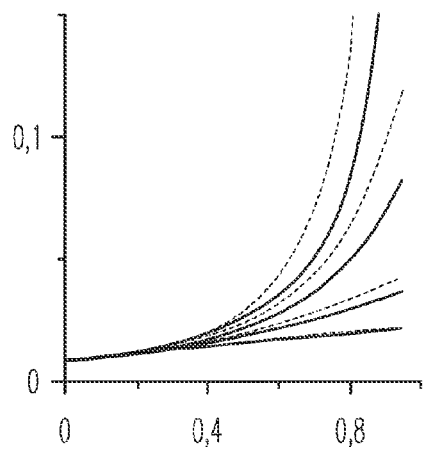

We consider cases with constant and exponentially distributed service times. FIG. 3 including diagrams 300 and FIG. 4 including diagrams 400 show for each priority class the average response times under SED and MIPN policies versus server utilization $\rho$. Performance of proposed MIPN policy is slightly worse at low utilizations, but in high load conditions MIPN outperforms SED.

TECHNICAL EXAMPLES

Example 1

Let us consider a communication network where datagrams are routed and the routing decisions are made by edge routers. The class of a datagram can be the application type to which the datagram is related. To optimize the routing in the network the routing decisions by the edge routers can be based on MIPN.

Example 2

Let us consider a health center patient workflow. The arriving patients are sent to examining doctors, and before the examination the patients may be prepared by nurses or visit the laboratory. The patient class can be the type of special problem she or he has. The routing of arriving patients to examining doctors can be based on MIPN.

Example 3

In a microprocessor system tasks to be processed are sent to the processors by preprocessors. The MIPN policy can be applied so that the preprocessors are considered as dispatchers and the processors as nodes.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims and the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method comprising:

selecting a node in a system including several nodes, multiclass tasks and at least one dispatcher, in which system when a new task arrives to the dispatcher the dispatcher assigns the new task to one of the nodes, which selection of the nodes by the dispatcher is based on MIPN (Multiclass Idle Period Notification) information sent by the nodes to the dispatcher, which the MIPN information is sent by a node each time it becomes free from tasks of a particular class, and which the MIPN information contains at least the identification of the node and the identification of the class, and in which system for each node and class the dispatcher keeps record of the times when current busy period starts and ends, which current busy period starts when the first task of the class is sent by the dispatcher to the node after it has received the last MIPN information related to the class and which current busy period ends when dispatcher receives from the node new MIPN-information related to the class, wherein the mean service time of the task of the class can be estimated as the average of the ratios which are calculated by dividing the length of each past busy period of the node for the class by the number of tasks of the class assigned to the node during that busy period, which length of the busy period of the node for the class is calculated as the difference of the end time and the start time of the busy period of the node for the class.

2. The method according to the claim 1, wherein the amount of work assigned to the node during the current busy period of the node for the class is the sum of the amount of work associated with each task of the class assigned to the node during the current busy period of the node for the class.

3. The method according to the claim 1, wherein the dispatcher sends a new task to the node with the smallest amount of work assigned to the node during the current busy period of the node for the class to which the task belongs.

4. The method according to claim 1, wherein, if the dispatcher does not know the amount of work of each task, it can estimate the amount of work assigned to the node during the current busy period of the node for a class by multiplying the number of tasks of the class assigned to the node by the mean service time of the task of the class.

* * * * *